(12) United States Patent
Suzuki

(10) Patent No.: US 12,222,324 B2
(45) Date of Patent: Feb. 11, 2025

(54) ULTRASONIC INSPECTION SYSTEM AND ULTRASONIC INSPECTION METHOD

(71) Applicant: Hitachi Power Solutions Co., Ltd., Hitachi (JP)

(72) Inventor: Mutsumi Suzuki, Tokyo (JP)

(73) Assignee: Hitachi Power Solutions Co., Ltd., Hitachi (JP)

(*) Notice: Subject to any disclaimer, the term of this patent is extended or adjusted under 35 U.S.C. 154(b) by 389 days.

(21) Appl. No.: 17/636,631

(22) PCT Filed: Aug. 1, 2020

(86) PCT No.: PCT/JP2020/031659
§ 371 (c)(1),
(2) Date: Feb. 18, 2022

(87) PCT Pub. No.: WO2021/039640
PCT Pub. Date: Mar. 4, 2021

(65) Prior Publication Data
US 2022/0283125 A1    Sep. 8, 2022

(30) Foreign Application Priority Data

Aug. 28, 2019  (JP) .................. 2019-155807

(51) Int. Cl.
*G01N 29/11*  (2006.01)
*G01N 29/22*  (2006.01)
(Continued)

(52) U.S. Cl.
CPC ........... *G01N 29/11* (2013.01); *G01N 29/221* (2013.01); *G01N 29/265* (2013.01);
(Continued)

(58) Field of Classification Search
CPC .... G01N 29/11; G01N 29/221; G01N 29/265; G01N 29/4427; G01N 2291/015;
(Continued)

(56) References Cited

U.S. PATENT DOCUMENTS 4,030,342 A * 6/1977 Bond .................. G01S 15/8993
73/620
5,372,042 A * 12/1994 Jarman .................. G01N 29/26
73/599
(Continued)

FOREIGN PATENT DOCUMENTS

JP           62-59819 A      3/1987
JP         2008-128965 A     6/2008
(Continued)

OTHER PUBLICATIONS

Translation of JP 2009063372 A (Year: 2009).*
(Continued)

*Primary Examiner* — John E Breene
*Assistant Examiner* — Rose M Miller
(74) *Attorney, Agent, or Firm* — Crowell & Moring LLP

(57) ABSTRACT

To improve defect detection accuracy, an ultrasonic inspection device causing an ultrasound beam to enter an object through a gas for inspection of the object includes: a transmission probe emitting the ultrasound beam; a reception probe mounted on an opposite side of the object from the transmission probe; and an eccentric distance adjuster that adjusts an eccentric distance between a transmission sound axis which is the central axis of the propagation path of the ultrasound beam transmitted from the transmission probe and a reception sound axis which is the central axis of the propagation path of an ultrasound beam assumed to be emitted from the reception probe to a distance greater than zero.

22 Claims, 12 Drawing Sheets

(51) Int. Cl.
*G01N 29/265* (2006.01)
*G01N 29/44* (2006.01)
*G01N 29/46* (2006.01)

(52) U.S. Cl.
CPC ......... *G01N 29/4427* (2013.01); *G01N 29/46* (2013.01); *G01N 2291/015* (2013.01); *G01N 2291/045* (2013.01); *G01N 2291/102* (2013.01); *G01N 2291/103* (2013.01)

(58) Field of Classification Search
CPC ....... G01N 2291/102; G01N 2291/103; G01N 29/46; G01N 2291/045
USPC ......................................................... 73/627
See application file for complete search history.

(56) References Cited

U.S. PATENT DOCUMENTS

2008/0127731 A1* 6/2008 Shirai .................. G01N 29/32
73/627
2014/0216158 A1 8/2014 Sanabria Martin et al.

FOREIGN PATENT DOCUMENTS

| JP | 2009063372 A | * | 3/2009 |
| JP | 2009-97942 A | | 5/2009 |
| JP | 2012-13447 A | | 1/2012 |
| JP | 5075850 B2 | | 11/2012 |
| WO | WO 2018/229914 A1 | | 12/2018 |
| WO | WO-2022180972 A1 | * | 9/2022 |

OTHER PUBLICATIONS

Translation of WO 2022180972 A1 (Year: 2022).*
International Search Report (PCT/ISA/210) issued in PCT Application No. PCT/JP2020/031659 dated Oct. 27, 2020 with English translation (four (4) pages).

* cited by examiner

ULTRASONIC INSPECTION SYSTEM AND ULTRASONIC INSPECTION METHOD

TECHNICAL FIELD

The present invention relates to a technique for an ultrasonic inspection device system and an ultrasonic inspection method to search for a defect with ultrasound.

BACKGROUND ART

Defects included within an object can be detected by irradiation of ultrasound beams, for example. This utilizes reflection characteristics of ultrasound due to an acoustic impedance gap.

Defects included within an object also can be detected using transmission characteristics of ultrasound. If the object includes a defect (a cavity or the like) having a small acoustic impedance, such as air, for example, an acoustic impedance gap caused within the object reduces transmission of ultrasound beams. By measuring the transmitted ultrasound beams, the defect included within the object therefore can be detected.

Known ultrasonic inspection techniques for inspection targets include a technique described in Patent Literature 1. Patent Literature 1 discloses an ultrasonic inspection device "that moves an ultrasonic probe in in-plane directions parallel to the surface of an object while emitting ultrasound from the ultrasonic probe toward the object, receives a reflected echo wave returned from the object with the ultrasonic probe, transforms a signal concerning the reflected echo wave to digital waveform data, transmits the digital waveform data to an arithmetic processing unit, and performs arithmetic operation with the arithmetic processing unit to inspect an internal defect within the object, in which the arithmetic processing unit includes: an extraction unit which when a plurality of the reflected echo waves interfere with each other, extracts a change caused in a waveform characteristic in a frequency range of a reception waveform concerning the plurality of reflected echo waves that have interfered; and an image creation unit that creates an image concerning the internal defect based on the extracted change, and the extraction unit includes: a transformation unit that performs Fourier transformation for data concerning the reception waveform to calculate a power spectrum; an operating unit that calculates at least one dip frequency at which the power spectrum value is reduced in the power spectrum calculated by the Fourier transformation; and a band setting unit that sets a band for the dip frequency, and in which the ultrasonic inspection device inspects the internal defect based on the created image" (see claim 1) and an ultrasonic inspection method therefor.

The method described in Patent Literature 1 is called an immersion method, in which the object needs to be immersed in water. The reason for using the immersion method is to minimize attenuation of the ultrasound beam.

However, the immersion method causes great restrictions on objects, and the immersion method is not applicable to objects sensitive to water. Thus, there is a demand for a method of inspecting an object placed in air with a transmission probe and a reception probe placed apart from the object.

On the other hand, if an ultrasound beam enters an object through air, the received signal is extremely faint. For example, Patent Literature 2 discloses an airborne ultrasonic flaw detection system "which applies a rectangular burst signal (a) composed of a predetermined number of successive negative rectangular waves to a transmission ultrasonic probe (12) which is opposed to an object (11) via air (46), transforms ultrasound that has propagated through the object into a transmitted wave signal (b) with a reception ultrasonic probe (13) opposed to the object via air, and determines whether the object includes a defect based on the signal level of the transmitted wave signal and in which in the transmission and reception ultrasonic probes, acoustic impedances of an oscillator (42) and a front plate (45) mounted on the side of the oscillator that transmits and receives ultrasound are set lower than those of a contact-type ultrasonic probe to be used in contact with the object" (see the abstract).

CITATION LIST

Patent Literature

Patent Literature 1: JP5075850B2
Patent Literature 2: JP2008-128965A

SUMMARY OF INVENTION

Technical Problem

The inventors' studies have revealed that the technique described in Patent Literature 2 has difficulties in detecting small defects.

The present invention was made in the light of the aforementioned background, and an object of the present invention is to improve the defect detection accuracy.

Solution to Problem

To solve the above problems, the present invention is an ultrasonic inspection device system that causes an ultrasound beam to enter an object through a gas for inspection of the object, the device system including: a transmission probe emitting the ultrasound beam; a reception probe mounted on an opposite side of the object from the transmission probe; and a distance adjuster that adjusts an eccentric distance between a transmission sound axis of the transmission probe and a reception sound axis of the reception probe to a distance greater than zero.

The other solutions are described below in the description of embodiments.

Advantageous Effects of Invention

According to the present invention, it is possible to improve the defect detection accuracy.

DESCRIPTION OF EMBODIMENTS

Figure 1:
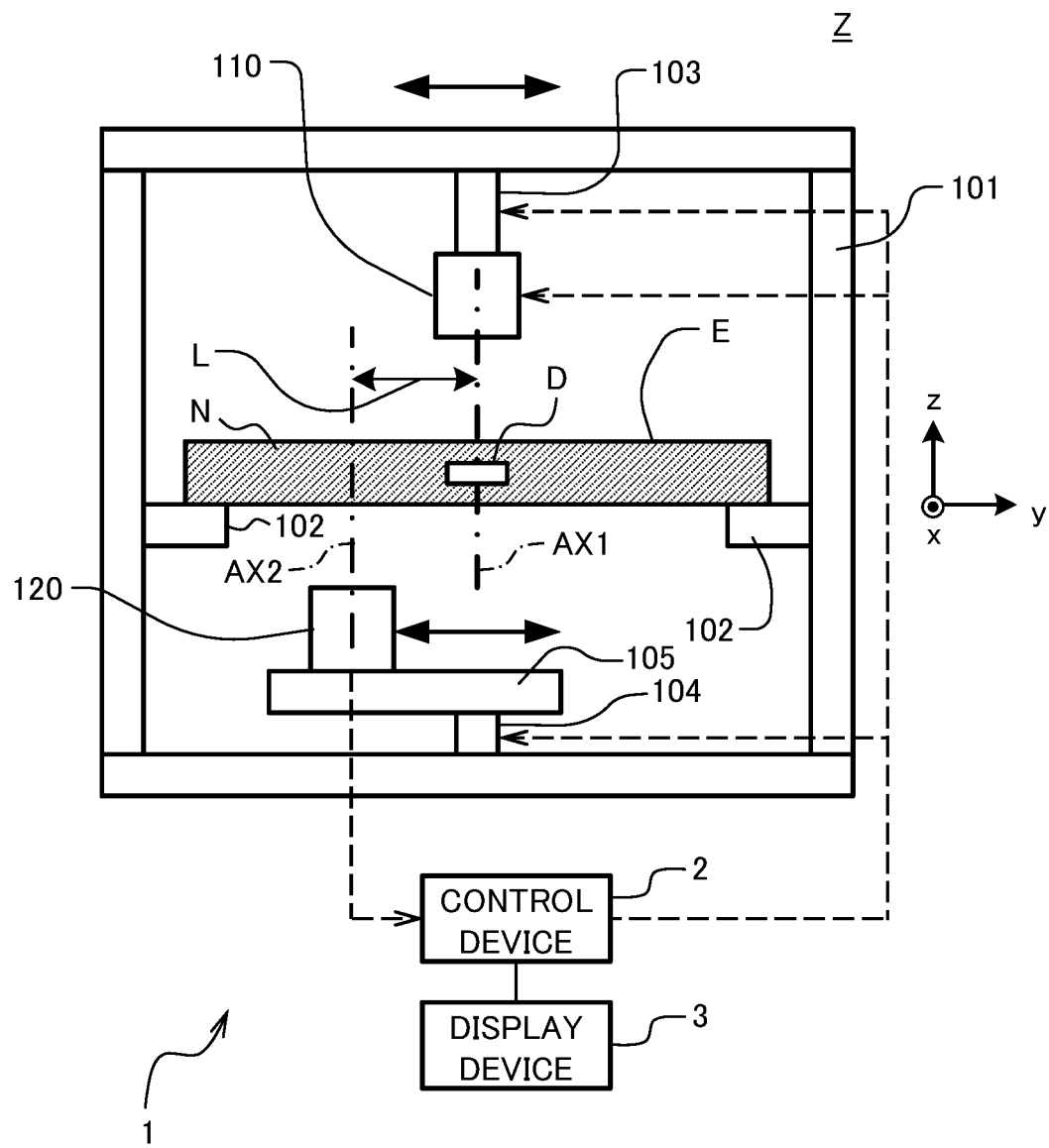
FIG. 1 is a diagram showing the configuration of an ultrasonic inspection system of a first embodiment.

Hereinafter, modes for carrying out the present invention (referred to as embodiments) will be described with reference to the accompanying drawings. The present invention is not limited to the following embodiments. For example, different embodiments of the present invention can be combined, or embodiments can be modified without significantly reducing the effect of the present invention.

The same members are given the same reference characters, and the overlapping description is omitted. The contents shown in the drawings may be altered from the actual configurations without significantly reducing the effect of the present invention for convenience of illustration.

[First Embodiment]
(Ultrasonic Inspection Device 1)

FIG. 1 is a diagram showing the configuration of an ultrasonic inspection system Z of a first embodiment.

As shown in FIG. 1, the ultrasonic inspection system Z includes an ultrasonic inspection device 1 and a control device 2 coupled to a display device 3. FIG. 1 shows the ultrasonic inspection device 1 in a schematic cross-sectional view.

The ultrasonic inspection device 1 is configured to inspect an object E with ultrasound beams U (see FIG. 4) entering the object E via a gas. A housing 101 is thus hollow inside. FIG. 1 shows a three-axis Cartesian coordinate system including an x axis extending in a perpendicular direction to the page, a y axis extending in a horizontal direction on the page, and a z axis extending in a vertical direction on the page.

The ultrasonic inspection device 1 is provided with a sample table 102 fixed to the housing 101, and the object E is placed on the sample table 102. The object E is any matter that is composed of a material in which sound travels faster than in a gas such as air. The object E is composed of a solid material, for example. Specifically, the object E is made of metal, glass, a resin material, or a composite material such as carbon-fiber reinforced plastics (CFRP). In the example of FIG. 1, the object E includes a defect D inside. The defect D is a cavity or the like. Part of the object E other than the defect D is referred to as normal part N.

The ultrasonic inspection device 1 includes a transmission probe 110 provided with a transducer P (see FIG. 4) and a reception probe 120. The reception probe 120 is placed on the opposite side of the object E from the transmission probe 110 and receives the ultrasound beams U emitted from the transmission probe 110. Specifically, the ultrasonic inspection device 1 includes the transmission probe 110, which is mounted on the housing 101 via a transmission probe mover 103.

Herein, the "opposite side to the transmission probe 110" means one of two spaces separated by the object E which is opposite (opposite in the z-axis direction) to the space where the transmission probe 110 is located and does not mean the opposite side where x and y coordinates are the same as those of the transmission probe 110 (that is, the position symmetric to the transmission probe 110 with respect to the x-y plane). As shown in FIG. 1, the transmission probe 110 and reception probe 120 are mounted with a transmission sound axis AX1 and a reception sound axis AX2 shifted from each other by an eccentric distance L. The transmission and reception sound axes AX1 and AX2 and the eccentric distance L are described later.

As described above, movement of a reception probe mover 104 allows the reception probe 120 to scan the sample table 102 in the x- and y-axis directions. The transmission probe 110 and reception probe 120 perform scanning while keeping the eccentric distance L in the x- or y-axis direction with the object E interposed therebetween (thick double-headed arrows).

The reception probe mover 104 mounted on the housing 101 is provided with an eccentric distance adjuster 105. The eccentric distance adjuster 105 is provided with the reception probe 120. The eccentric distance adjuster 105 sets the separation between the reception and transmission sound axes AX2 and AX1 to the eccentric distance L.

In the first embodiment, the eccentric distance adjuster 105 is provided on the reception probe mover 104 side but may be provided on the transmission probe mover 103 side.

The ultrasonic inspection device 1 is coupled to the control device 2. The control N instructs the transmission probe mover 103 and reception probe mover 104 to control movement (scanning) of the transmission probe 110 and reception probe 120. The transmission probe mover 103 and reception probe mover 104 synchronously move in the x- and y-axis directions, so that t the transmission probe 110 and reception probe 120 scan the object E in the x- and y-axis directions. The control device 2 causes the transmission probe 110 to emit the ultrasound beams U and performs a waveform analysis based on a signal acquired from the reception probe 120.

The first embodiment shows an example in which the transmission probe 110 and the reception probe 120 are moved while the object E is fixed to the housing 101 with the sample table 102 interposed therebetween, that is, with the object E fixed to the housing 101. In contrast, scanning may be performed by moving the object E with the transmission probe 110 and the reception probe 120 fixed to the housing 101.

There is a gas phase, which is a gas such as air, between the transmission probe 110 and the object E and between the reception probe 120 and the object E. In other words, the ultrasonic inspection device 1 is of non-contact type in which none of the transmission probe 110 and reception probe 120 comes into contact with the object E.

The transmission probe 110 is of beam-focusing type. The reception probe 120 is a probe having a lower beam-focusing ability than the transmission probe 110. In the first embodiment, the reception probe 120 employs a non-beam-focusing type probe including a flat transducer surface. By using the non-beam-focusing type reception probe 120, it is possible to collect information of the defect D in a wide range.

In the first embodiment, the reception probe 120 is shifted by the eccentric distance L in the y-axis direction of FIG. 1 with respect to the transmission probe 110. The reception probe 120 may be shifted by the eccentric distance L in the x-axis direction of FIG. 1. Alternatively, the reception probe 120 may be located at L1 in the x-axis direction and L2 in the y-axis direction (that is, at the position (L1, L2) when the position of the transmission probe 110 in the x-y plane is the origin).

(Definition of Eccentric Distance L)

Figure 2A:
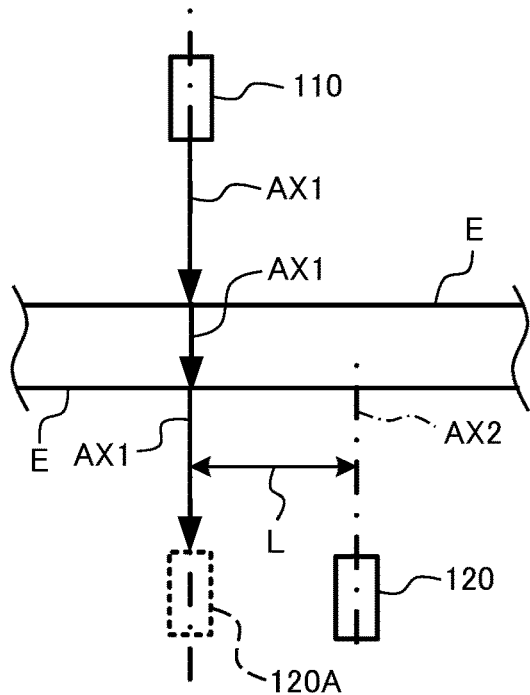
FIG. 2A is a diagram for explaining a transmission sound axis, a reception sound axis, and an eccentric distance (No. 1)
Figure 2B:
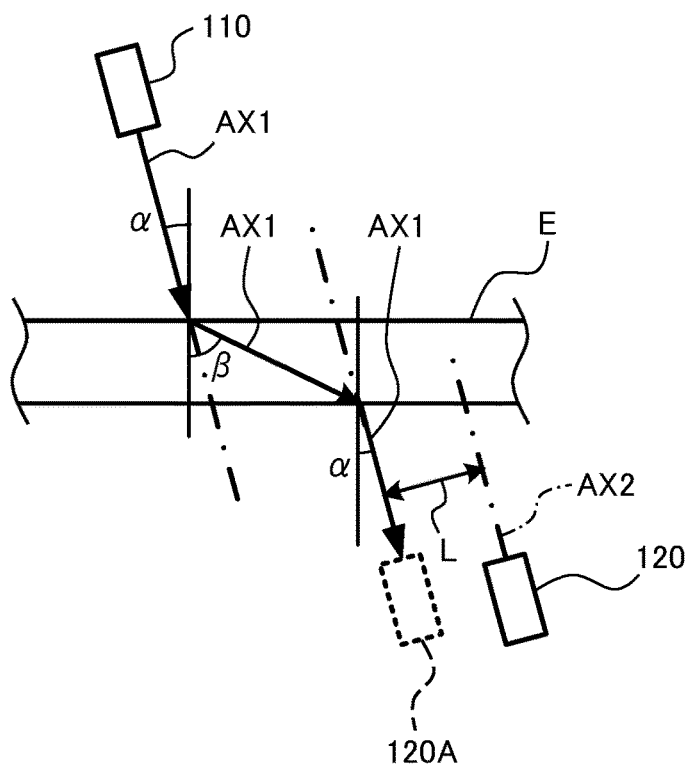
FIG. 2B is a diagram for explaining the transmission sound axis, reception sound axis, and eccentric distance (No. 2)

FIGS. 2A and 2B are diagrams for explaining the transmission sound axis AX1, reception sound axis AX2, and eccentric distance L.

A sound axis is defined as the central axis of the ultrasound beams U. The transmission sound axis AX1 is defined as a sound axis of the propagation path of the ultrasound beams U emitted from the transmission probe 110. In other words, the transmission sound axis AX1 is the central axis of the propagation path of the ultrasound beams U emitted from the transmission probe 110.

The reception sound axis AX2 is defined as the sound axis of the propagation path of virtual ultrasound beams when are ultrasound beams U assumed to be emitted from the reception probe 120. In other words, the reception sound axis AX2 is the central axis of the virtual ultrasound beams which are ultrasound beams U assumed to be emitted from the reception probe 120.

As illustrated in FIG. 2B, the transmission sound axis AX1 includes refraction on interfaces of the object E. Specifically, as illustrated in FIG. 2B, when the ultrasound beams U emitted from the transmission probe 110 refract on the interfaces of the object E, the center (sound axis) of the propagation path of the refracted ultrasound beams U is included in the transmission sound axis AX1.

The eccentric distance L is defined as the distance of separation between the transmission sound axis AX1 and the reception sound axis AX2. When the ultrasound beams U emitted from the transmission probe 110 refract as illustrated in FIG. 2B, the eccentric distance L is defined as the distance of separation between the bent transmission sound axis AX1 and the reception sound axis AX2. In the ultrasonic inspection system Z of the first embodiment, the transmission probe 110 and reception probe 120 are adjusted by the eccentric distance adjuster 105 so that the thus-defined eccentric distance L be greater than zero.

FIG. 2A is a diagram illustrating the transmission probe 110 being arranged along the normal direction to the surface of the object E.

In FIG. 2A, the transmission sound axis AX1 is indicated by solid arrow. The reception sound axis AX2 is indicated by dashed-and-dotted arrow. In FIGS. 2A and 2B, the position of each reception probe 120A indicated by a dashed line is the position at which the eccentric distance L is zero. The reception probe 120 indicated by a solid line is the reception probe 120 located at the position with the eccentric distance L.

When the transmission probe 110 is mounted such that the transmission sound axis AX1 is perpendicular to the horizontal plane (the x-y plane of FIG. 1) like the example shown in FIG. 2A, the propagation path of the ultrasound beams U does not bend, that is, the transmission sound axis AX1 does not bend.

FIG. 2B is a diagram showing the transmission probe 110 being tilted at an angle α from the normal direction to the surface of the object E.

In FIG. 2B, similarly to FIG. 2A, the transmission sound axis AX1 is indicated by solid arrow, and the reception sound axis AX2 is indicated by the dashed-and-dotted arrow. In the example shown in FIG. 2B, as described above, the propagation path of the ultrasound beams U bends at the interfaces between the object E and air. The transmission sound axis AX1 bends as indicated by the solid arrows in FIG. 2B. In this case, the position of the reception probe 120A indicated by the dashed line is located on the transmission sound axis AX1 and is the position at which the eccentric distance L is zero. As described above, the position of the reception probe 120 indicated by the solid line is the position of the reception probe 120 with the eccentric distance L.

In the example shown in FIG. 1, the transmission probe 110 is mounted along the normal direction to the surface of the object E, and the eccentric distance L is as shown in FIG. 2A.

The eccentric distance L is set at such a position that the received signal strength for the defect D in the object E be higher than that for the normal part N. This point will be described later.

(Control Device 2)

Figure 3:
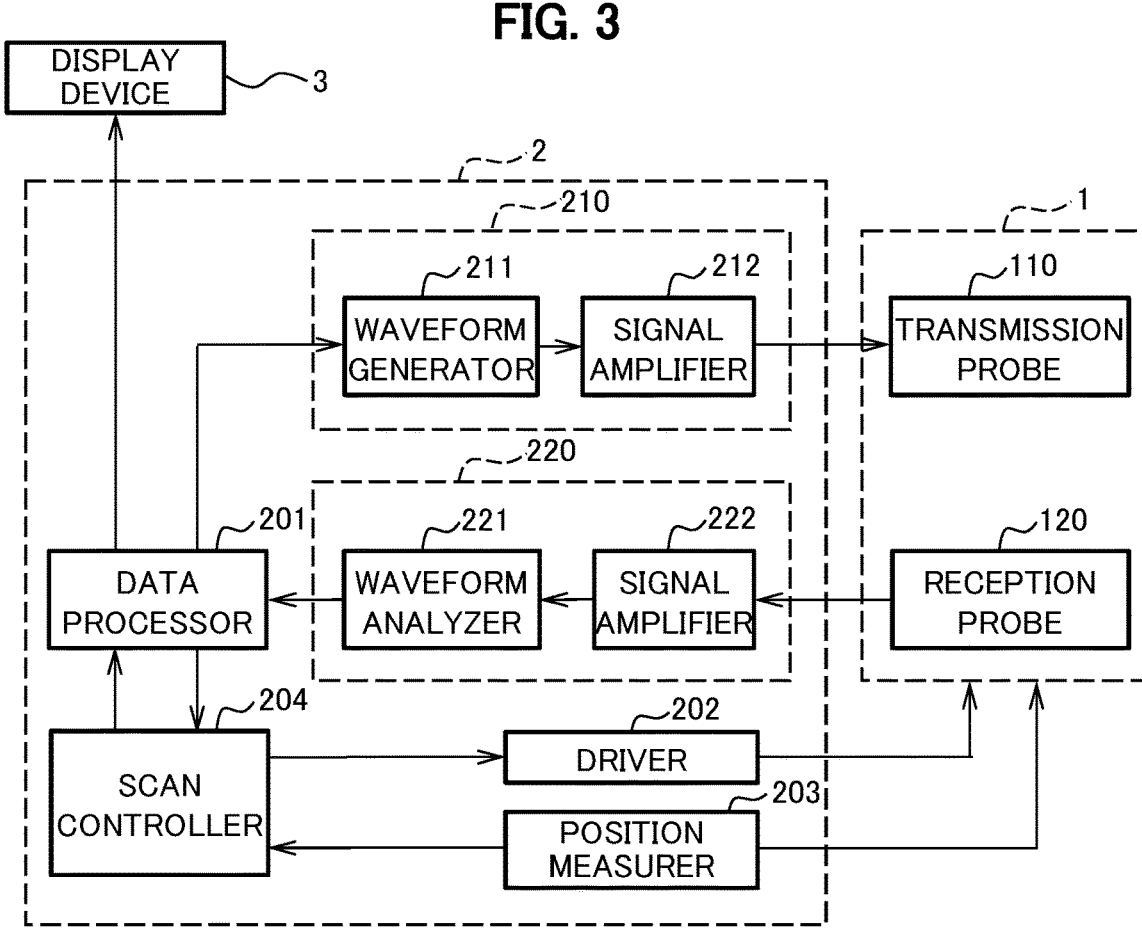
FIG. 3 is a functional block diagram of a control device.

FIG. 3 is a functional block diagram of the control device 2.

The control device 2 included in the ultrasonic inspection device 1 is configured to control drive of the ultrasonic inspection device 1. The control device 2 includes a transmission system 210, a reception system 220, a data processor 201, a scan controller 204, a driver 202, and a position measurer 203.

The transmission system 210 is a system that generates a voltage to be applied to the transmission probe 110. The transmission system 210 includes a waveform generator 211 and an output amplifier 212. The waveform generator 211 generates a burst wave signal. The generated bust wave signal is amplified with the output amplifier 212. The voltage outputted from the output amplifier 212 is applied to the transmission probe 110.

The reception system 220 is a system that detects the received signal outputted from the reception probe 120. The signal outputted from the reception probe 120 is inputted to the signal amplifier 222 to be amplified. The amplified signal is inputted to the waveform analyzer 221.

The waveform analyzer 221 creates later-described signal strength data (see FIG. 6) from the received signal. The created signal strength data is sent to the data processor 201.

The data processor 201 performs processing for acquired information into a desired form, such as creating an image showing information concerning the defect D in the object E or detecting the presence of the defect D. Images and information created by the data processor 201 are displayed in the display device 3.

The scan controller 204 drives and controls the transmission probe mover 103 and reception probe mover 104 shown in FIG. 1. The drive and control of the transmission probe mover 103 and reception probe mover 104 are performed though the driver 202. The scan controller 204 measures the position information of the transmission probe 110 and reception probe 120 through the position measurer 203.

Herein, based on the position information of the transmission probe 110 and reception probe 120 that is received from the scan controller 204, data processor 201 plots the signal strength data for each position to create an image, which is then displayed in the display device 3.

As described later, in the first embodiment, the signal strength data for the defect D is greater than that for the normal part. Plotting the signal strength data against the scan position (x, y) of the transmission probe 110 provides an image showing the position (x, y) of a defect. The image showing the defect position is displayed in the display device 3.

(Structure of Transmission Probe 110)

Figure 4:
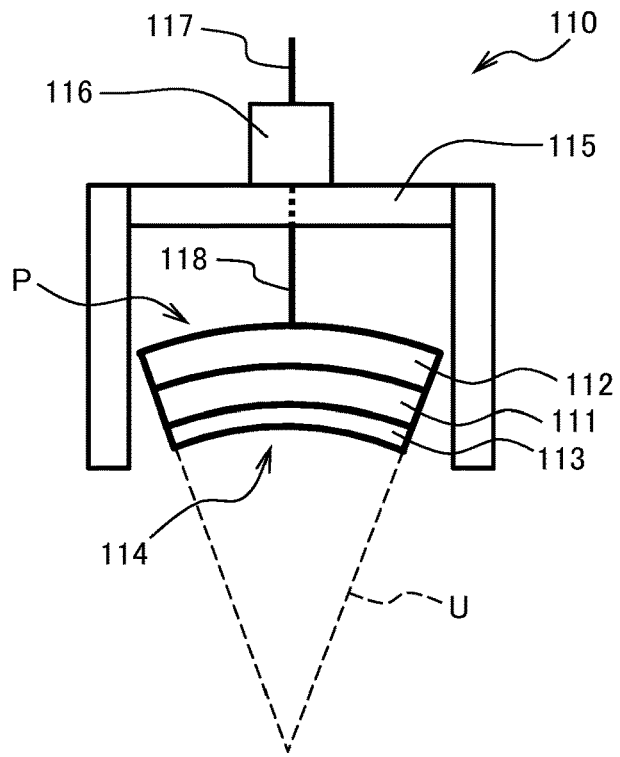
FIG. 4 is a schematic cross-sectional diagram showing the structure of a transmission probe.

FIG. 4 is a schematic cross-sectional view showing the structure of the transmission probe 110.

FIG. 4 shows only the profile of the emitted ultrasound beams U for simplification, but actually, a great number of ultrasound beams U are emitted in the normal vector direction of the transducer surface 114 across the entire area of the transducer surface 114.

The transmission probe 110 is configured to focus the ultrasound beams U. This allows for accurate detection of the small defect D in the object E. The reason that the small defect D can be detected is described later. The transmission probe 110 includes a transmission probe housing 115 and includes the transducer P within the transmission probe housing 115. The transducer P includes a backing 112, an oscillator 111, and a matching layer 113. The transducer P is coupled to a connector 116 through a lead 118. The connector 116 is further coupled to a power supply device (not shown) and the control device 2 through a lead 117.

(Reception Waveform)

Figure 5A:
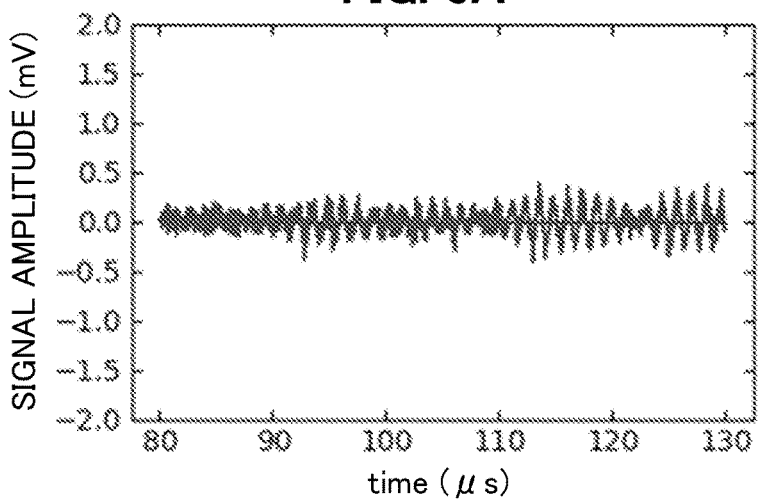
FIG. 5A is a diagram showing a reception waveform from the transmission probe (No. 1)
Figure 5B:
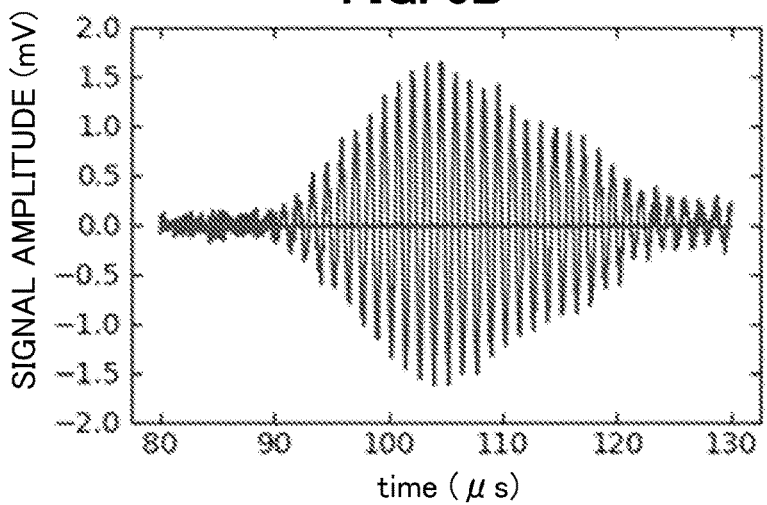
FIG. 5B is a diagram showing a reception waveform from the transmission probe (No. 2)

FIGS. 5A and 5B are diagrams illustrating reception waveforms from the reception probe 120. FIG. 5A is a diagram showing a reception waveform corresponding to the normal part N of the object E, that is, corresponding to a part other than the defect D. FIG. 5B shows the received signal when the transmission probe 110 is located at the x-y coordinate position of a 2-mm wide cavity (the defect D) provided within the object E. In FIGS. 5A and 5B, the time indicates the time having elapsed since a burst wave is applied to the transmission probe 110.

In FIGS. 5A and 5B, the object E was a 2 mm thick stainless plate. To the transmission probe 110, a burst wave with a frequency of 800 kHz was applied. More specifically, a bust wave composed of ten sine waves was applied to the object E with a constant period.

FIG. 5A does not include any significant signal observed. FIG. 5B includes a significant signal observed 90 ms after the burst wave is applied to the transmission probe 110. The delay of 90 ms until this significant signal is observed corresponds to a time necessary for scattered waves U1 (see FIG. 7B) to reach the reception probe 120. Specifically, the speed of sound is 340 (m/s) in air while being about 6000 (m/s) in stainless.

Figure 6:
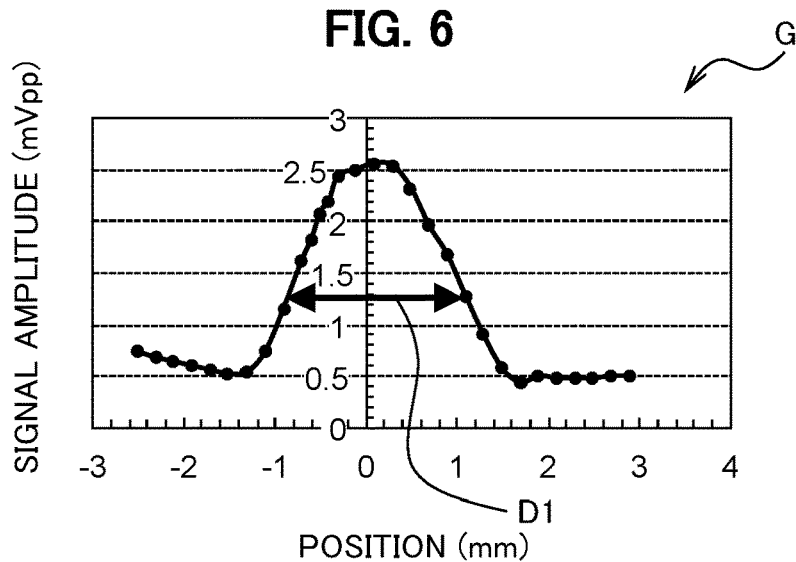
FIG. 6 is a diagram showing a plot example of signal strength data.

FIG. 6 shows plots of signal strength data extracted from the received signals (the received signal shown in FIG. 5B) for the respective x-axis positions which are obtained by moving the transmission probe 110 and reception probe 120 in the x-axis direction for the 2-mm wide defect D.

In the first embodiment, the method of extracting the signal strength data extracts a peak-to-peak value of the received signal shown in FIG. 5B, that is, the difference between the maximum and minimum in a proper time domain.

Another example of the method of extracting the signal strength data may transform the received signal shown in FIG. 5B into frequency components through signal processing such as short-time Fourier transformation and extract the strength of a proper frequency component. The signal strength data may be a correlation function calculated based on a proper reference wave.

The signal strength data are thus acquired corresponding to each scan position of the transmission probe 110.

In the plots of the signal strength data shown in FIG. 6, the 2-mm wide cavity corresponds to reference character D1 of FIG. 6.

FIG. 6 reveals that the received signals have noise-level strength for the normal part N of the object E (part other than reference character D1) while the received signals are significantly large at the positions where the defect D is located inside (reference character D1).

The eccentric distance adjuster 105 sets the eccentric distance L so that the received signal strength detected by the reception probe 120 for the defect D be greater than that for the normal part N of the object E.

More preferably, the eccentric distance adjuster 105 sets the eccentric distance L so that any significant received signal be not detected for the normal part N of the object E.

When the transmission probe 110 is linearly moved only in the x-axis direction, the graph of signal strength data (a signal strength graph G) shown in FIG. 6 is displayed in the display device 3. When the transmission probe 110 is two-dimensionally moved in the x- and y-axis directions, plotting the signal strength data provides a defect position as a two-dimensional image, which is then displayed in the display device 3.

Figure 7A:
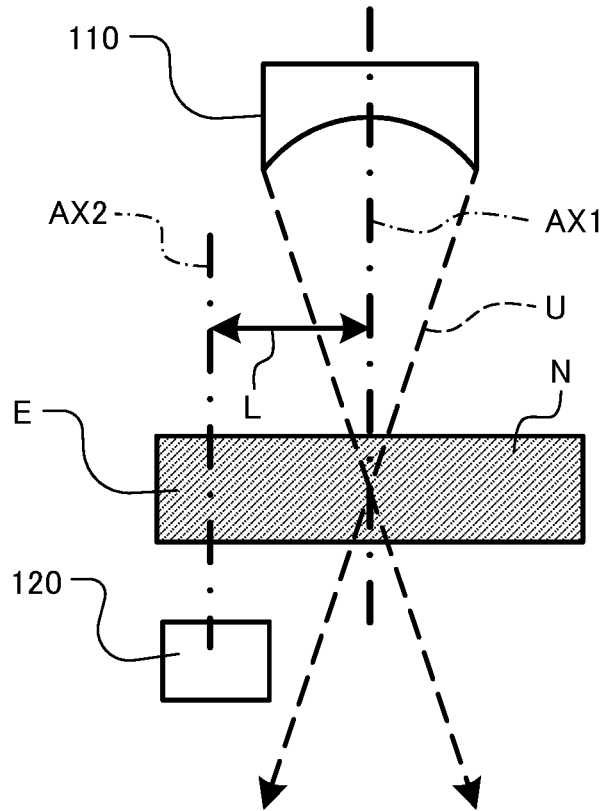
FIG. 7A is a diagram schematically showing a propagation path of ultrasound beams in the first embodiment (No. 1)
Figure 7B:
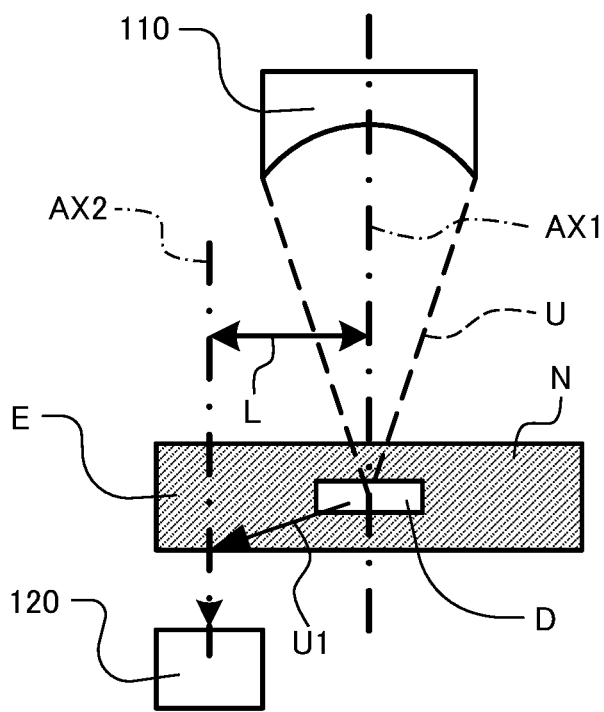
FIG. 7B is a diagram schematically showing a propagation path of ultrasound beams in the first embodiment (No. 2)

FIGS. 7A and 7B are diagrams schematically showing the propagation path of the ultrasound beams U in the first embodiment. FIG. 7A shows a case where the ultrasound beams U enter the normal part N, and FIG. 7B shows a case where the ultrasound beams U enter the defect D which is hollow inside.

As shown in FIGS. 7A and 7B, the ultrasound beams U emitted from the transmission probe 110 enter the object E. As shown in FIG. 7A, the ultrasound beams U having entered the normal part N pass through the vicinity of the center of the transmission sound axis AX1. Thus, no received signal is observed by the reception probe 120 located at the eccentric distance L from the transmission sound axis AX1. As shown in FIG. 7B, when the ultrasound beams U enter the defect D, the ultrasound beams U are scattered at the defect D, and the scattered waves U1 are received by the reception probe 120 eccentrically located. The received signal is thus observed.

In the ultrasonic inspection device 1 according to the first embodiment, the scattered waves U1 due to the defect D in the object E are observed by the reception probe 120. The ultrasonic inspection device 1 is characterized in that the received signal for the defect D is larger than the received signal for the normal part N. In other words, it is determined that the defect D is located at the position where the received signal is large.

COMPARATIVE EXAMPLE

Herein, a conventional method of ultrasonic inspection is described as a comparative example.

Figure 8A:
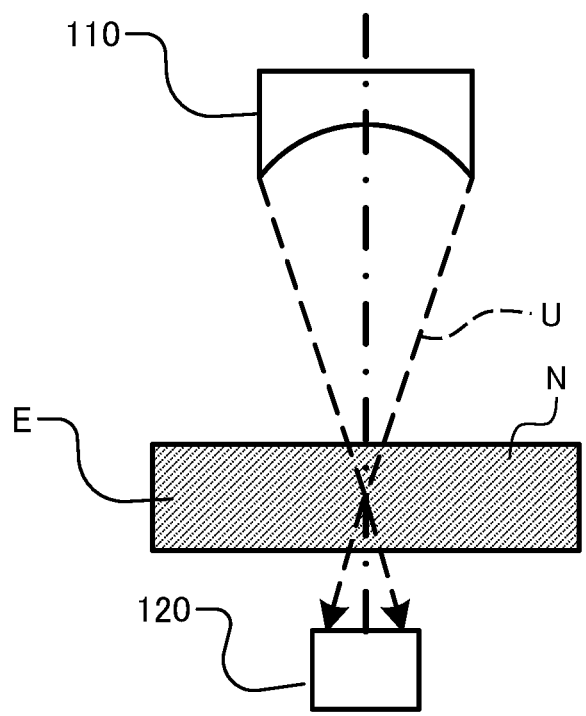
FIG. 8A is a diagram schematically showing a propagation path of ultrasound beams in a conventional ultrasonic inspection method (No. 1)
Figure 8B:
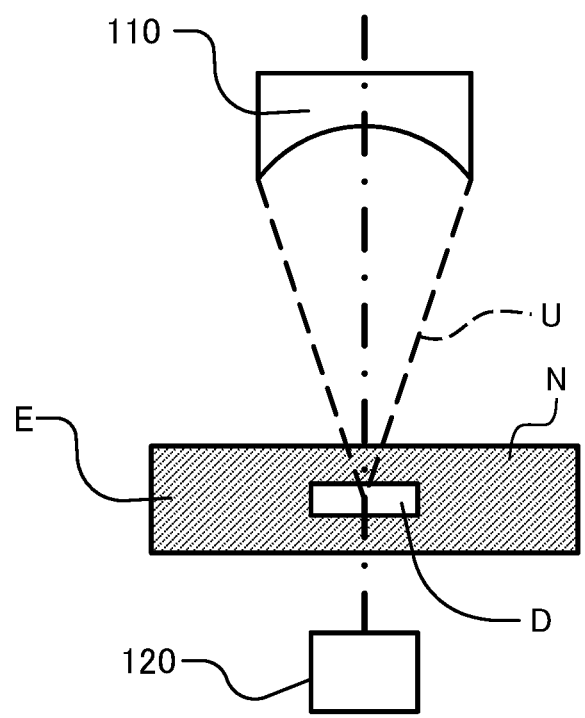
FIG. 8B is a diagram schematically showing a propagation path of ultrasound beams in the conventional ultrasonic inspection method (No. 2)

FIGS. 8A and 8B are diagrams schematically showing a propagation path of the ultrasound beams U in the conventional ultrasonic inspection method. FIG. 8A shows a case where the ultrasound beams U enter the normal part N, and FIG. 8B shows a case where the ultrasound beams U enter the defect D that is hollow inside.

In the conventional ultrasonic inspection method, as described in Patent Literature 2, for example, the transmission probe 110 and reception probe 120 are located such that the transmission sound axis AX1 is aligned with the reception sound axis AX2.

As shown in FIG. 8A, when the ultrasound beams U enter the normal part N of the object E, the ultrasound beams U pass through the object E and reach the reception probe 120, so that the received signal is large. As shown in FIG. 8B, when the ultrasound beams U enter the defect D, the defect D blocks transmission of the ultrasound beams U, thus reducing the received signal. The defect D is thus detected based on a decrease in the received signal. This is as shown in Patent Literature 2.

As shown in FIGS. 8A and 8B, the method of detecting the defect D based on a decrease in the received signal due to block of transmission of the ultrasound beams U at the defect D is referred to as a "blocking method". On the other hand, the inspection method that detects the scattered waves U1 at the defect D like the first embodiment is referred to as a "scattering method".

Figure 9:
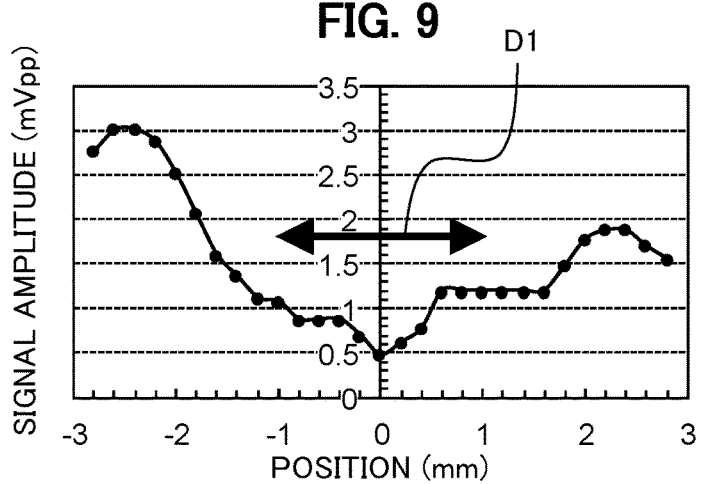
FIG. 9 is a diagram showing plots of signal strength data in the conventional ultrasonic inspection method.

FIG. 9 is a diagram showing a signal strength graph obtained by inspecting the object E including the same defect D as the object E used in FIG. 6 with the ultrasonic inspection method based on the blocking method shown in FIGS. 8A and 8B, that is, in the arrangement where the transmission and reception sound axes AX1 and AX2 are aligned with each other. In FIG. 9, the part indicated by reference character D1 corresponds to the defect D.

FIG. 9 shows a decrease in the signal at the center of the defect D (at the position "0" in FIG. 9), but the decrease is small. In contrast, as shown in FIG. 6, the position of the defect D can be detected clearly with the configuration by the scattering method of the first embodiment, compared to the result of FIG. 9 by the blocking method. In other words, the comparison of the reception result of the method according to the first embodiment shown in FIG. 6 with the reception result shown in FIG. 9 as the comparative example reveals that the method according to the first embodiment shown in FIG. 6 provides a higher SN ratio.

The reason why the scattering method of the first embodiment thus provides a higher SN ratio is described with reference to FIGS. 10A and 10B.

Figure 10A:
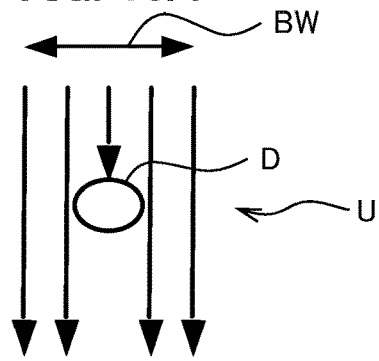
FIG. 10A is a diagram schematically showing an interaction between a defect and ultrasound beams within an object (No. 1)
Figure 10A:
Figure 10B:
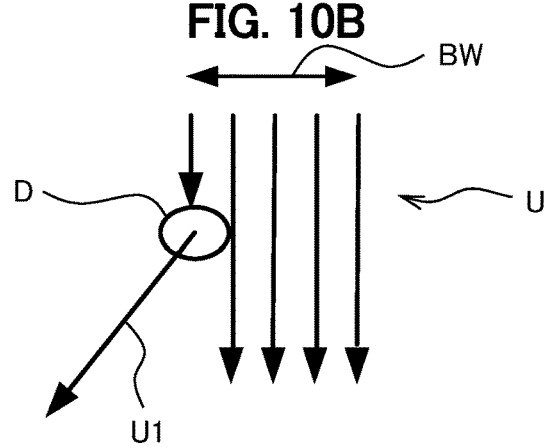
FIG. 10B is a diagram schematically showing an interaction between the defect and ultrasound beams within the object (No. 2)
Figure 10B:
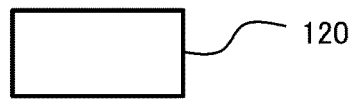

FIGS. 10A and 10B are diagrams schematically showing an interaction between the defect D and ultrasound beams U within the object E.

The following consideration is given for the case where the defect D is smaller than the width of the ultrasound beams U (hereinafter, referred to as beam width BW). The beam width BW is the width of the ultrasound beams U at the defect D.

FIGS. 10A and 10B schematically show the shape of the ultrasound beams U in a minute area around the defect D, in which the ultrasound beams U are parallel to each other. However, the ultrasound beams U are focused actually.

The positions of the reception probe 120 in FIGS. 10A and 10B are conceptual positions for clear explanation. The position and shape of the reception probe 120 are not scaled precisely. Specifically, in the figure enlargement scale of the defect D and ultrasound beams U, the reception probe 120 is located at a position more distant from the position shown in FIGS. 10A and 10B.

Even if the ultrasound beams U are focused to enter the object E, the ultrasound beams U have a certain finite width in the vicinity of the defect D. This is referred to as the beam width BW at the position of the defect D.

As described above, in the cases shown in FIGS. 10A and 10B, the beam width BW at the position of the defect D is greater than the size of the defect D.

FIG. 10A is a diagram showing the case of the blocking method. If the defect D is smaller than the beam width BW, some of the ultrasound beams U are blocked, and the received signal is reduced. However, the received signal cannot be reduced to zero. If the width of the defect D is 20% of the beam width BW, for example, the received signal is reduced by about 20% at maximum, thus making it difficult to detect the defect D. In other words, in the case like FIG. 10A, the received signal is reduced by 20% at maximum in the place including the defect D (see FIG. 9).

FIG. 10B is a diagram showing the method of the first embodiment, that is, the scattering method. In the scattering method, when the ultrasound beams U do not hit the defect D, the ultrasound beams U do not enter the probe 120, and the received signal is zero. As shown in FIG. 10B, if some of the ultrasound beams U hit the defect D, the scattered waves U1 are observed by the reception probe 120, and the scattering method can detect the defect D more easily than the blocking method. In the absence of the defect D, the received signal is zero, and in the presence of the defect D, even a very small defect, the received signal is not zero. The SN ratio can be therefore increased (see FIG. 6).

The method according to the first embodiment (the scattering method) allows for precise detection of the defect D smaller than the beam width BW.

As shown in FIG. 10A, furthermore, the blocking method determines the defect D based on a decrease from received signals corresponding to the normal part N. The received signals corresponding to the normal part N therefore need to be constant.

The strength of ultrasound having reached the reception probe 120, particularly through air, is extremely lower than that in an inspection device of the immersion method. It is therefore necessary to amplify the received signals by a high amplification factor (gain). Keeping the gain constant requires a highly accurate signal amplifier circuit.

With the scattering method according to the first embodiment, as shown in FIG. 6, the received signals are substantially zero for the normal part N while the received signals are observed for the defect D. This can lower the demand for the gain stability of the signal amplifier circuit. In FIG. 6, it is noted that the signal strength value is raised by an off-set value.

Another characteristic of the method according to the first embodiment is to provide a positive image. Specifically, the scattering method generates no signal or reduce received signals for the normal part N and generates a signal or increases received signals for the defect D. The scattering method thus provides a positive image of the defect D. On the other hand, the blocking method increases received signals for the normal part N and reduces received signals for the defect D. The blocking method thus provides a negative image of the defect D.

The ultrasonic inspection device 1 according to the first embodiment can be implemented only by shifting the position of the reception probe 120 of the conventional (blocking-type) ultrasonic inspection device by the eccentric distance L. The availability of inspection devices which are currently used leads to cost reduction.

Second Embodiment

Figure 11:
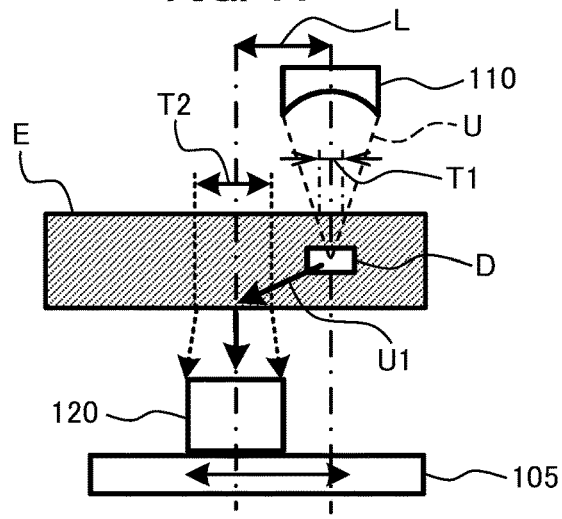
FIG. 11 is a diagram showing a relationship between a transmission probe and a reception probe in an ultrasonic inspection device according to a second embodiment.

FIG. 11 is a diagram illustrating the relationship between the transmission probe 110 and reception probe 120 in the ultrasonic inspection device 1 according to a second embodiment.

In the second embodiment, the relationship in beam-focusing ability between the transmission probe 110 and the reception probe 120 is described.

As illustrated in FIG. 11, in the second embodiment, the reception probe 120 has a lower beam-focusing ability than the transmission probe 110.

The propagation path of the scattered waves U1 varies to a certain extent depending on the depth of the defect D in the object E, the shape and inclination of the defect D, and the like. The reception probe 120 has a less beam-focusing ability in the second embodiment so that the reception probe 120 can detect the scattered waves U1 even if the propagation path of the scattered waves U1 varies. Beam incidence areas T1 and T2 are described later.

The magnitude relationship in beam-focusing ability in the second embodiment is defined by a magnitude relationship between the beam incidence areas T1 and T2 on the surface of the object E.

Figure 12:
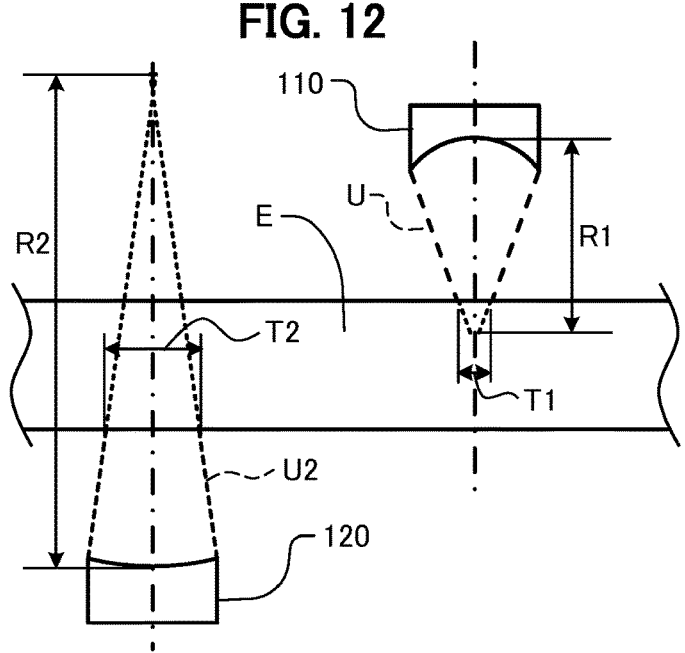
FIG. 12 is a diagram schematically showing a relationship between a beam incidence area of the transmission probe and a beam incidence area of the reception probe.

FIG. 12 is a diagram schematically showing the relationship between the beam incidence area T1 of the transmission probe 110 and the beam incidence area T2 of the reception probe 120.

The beam incidence area T1 of the transmission probe 110 is an area of intersection between the ultrasound beams U emitted from the transmission probe 110 and the surface of the object E. The beam incidence area T2 of the reception probe 120 is an area of intersection between virtual ultrasound beams U2, which are ultrasound beams U assumed to be emitted from the reception probe 120, and the surface of the object E.

In FIG. 12, the path of the ultrasound beams U is a path in the absence of the object E. In the presence of the object E, the ultrasound beams U refract on the surface of the object E and propagate along a different path from the path indicated by dashed lines.

As shown in FIG. 12, the beam incidence area T2 of the reception probe 120 is greater than the beam incidence area T1 of the transmission probe 110 in the second embodiment.

As described above, in the second embodiment, the beam-focusing ability of the reception probe 120 is lower than that of the transmission probe 110. This means that a focal range R2 of the reception probe 120 is greater than a focal range R1 of the transmission probe 110 as shown in FIG. 12.

In the second embodiment, thus, the reception probe 120 has a less focusing ability than the transmission probe 110. In other words, the focal range R2 of the reception probe 120 is set greater than the focal range R1 of the transmission probe 110. The beam incidence area T2 of the reception probe 120 is therefore wider, and the reception probe 120 is therefore able to detect the scattered wave U1 in a wider range. Even if the propagation path of the scattered waves U1 varies to a certain extent, the reception probe 120 is able to detect the scattered waves U1. This allows for detection of the defect D in a wider range.

The reception probe 120 may be a non-beam-focusing type probe like a probe used in the first embodiment. Since the focal range R2 of such a non-beam-focusing type probe is infinite and is greater than the focal range R1 of the transmission probe 110. In other words, even when the reception probe 120 is of non-beam-focusing type, the beam-focusing ability thereof is lower than that of the transmission probe 110.

Third Embodiment

Figure 13:
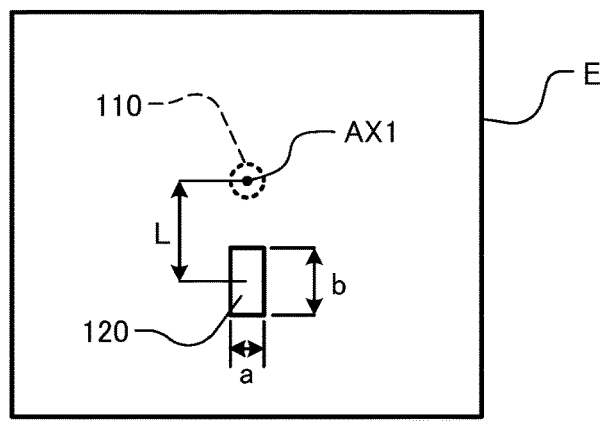
FIG. 13 is a diagram showing a reception probe example according to a third embodiment.

FIG. 13 is a diagram illustrating an example of the reception probe 120 according to a third embodiment.

FIG. 13 is a plan view of the ultrasonic inspection device 1 of the third embodiment, showing the positions of a transmission probe 110 and the reception probe 120 as seen in the positive z-axis direction, that is, as seen from the reception probe 120 side. The third embodiment is characterized in that the aspect ratio "b/a" of the oscillator 111 of the reception probe 120 is greater than 1. Herein, "b" is a characteristic length of the reception probe 120 along the direction of the eccentric distance L of the reception probe 120, and "a" is a characteristic length orthogonal thereto.

The characteristic lengths mean lengths of the sides of a rectangle for a rectangular oscillator and means major and minor axes of an ellipse for an elliptical oscillator.

Setting the aspect ratio of the reception probe 120 as described above allows the reception probe 120 to detect the scattered waves U1 even if the scattered waves U1 reach different positions depending on the depth position of the defect D.

The scattered waves U1 scatter radially around the transmission sound axis AX1. When the reception probe 120 is located at the position shown in FIG. 13, therefore, the scattered waves U1 scatter in the longitudinal direction (the "b" direction) of the reception probe 120. In other words, the "b" direction is the direction the scattered waves U1 are radiated. Increasing the value of "b" allows the reception probe 120 to detect the scattered waves U1 due to various defects D. Specifically, the reception probe 120 can detect the scattered waves U1 even if the scattered waves U1 reach different positions depending on the depth position of the defect D.

As the reception probe 120, FIG. 13 shows the cuboid (rectangular) reception probe 120. However, using the reception probe 120 which is elliptical with the major and minor axes set as described above provides the same effect.

Fourth Embodiment

Next, an ultrasonic inspection device 1a according to a fourth embodiment of the present disclosure is described with reference to FIGS. 14 and 15.

The fourth embodiment is characterized in that the reception probe 120 is tilted. This allows for an increase in strength of the received signal, thus improving the SN ratio (the signal-to-noise ratio) of the received signal.

Figure 14:
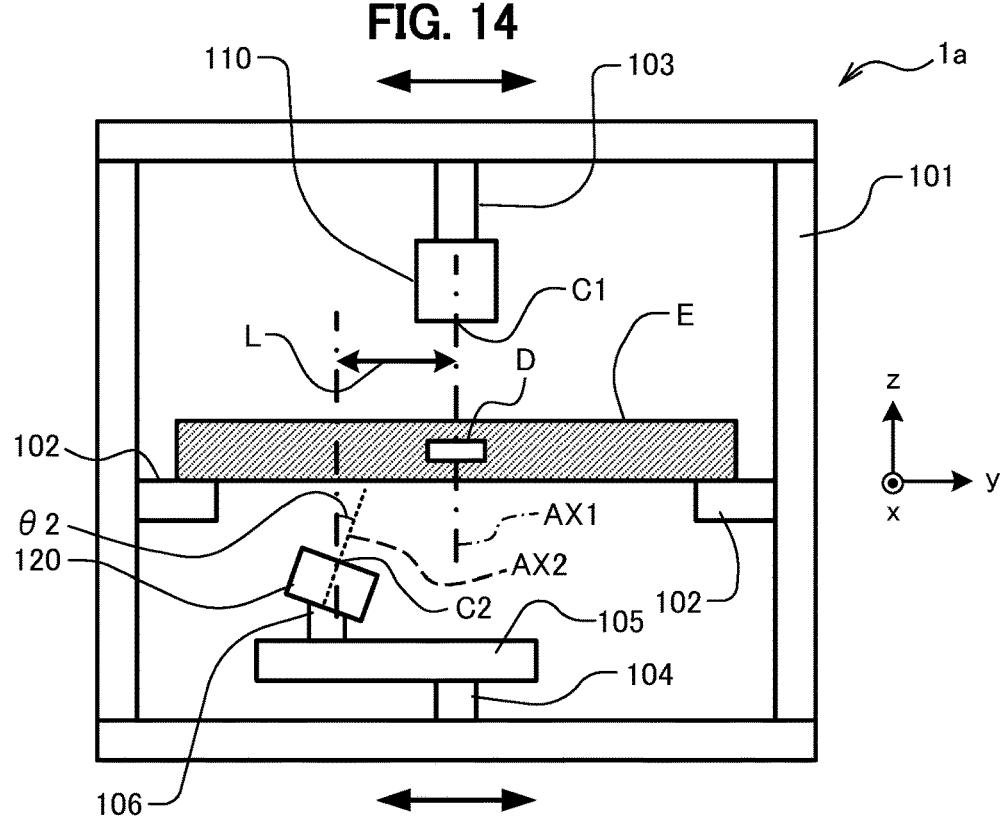
FIG. 14 is a diagram showing the configuration of an ultrasonic inspection device according to a fourth embodiment.

FIG. 14 is a diagram showing the configuration of the ultrasonic inspection device 1a according to the fourth embodiment.

Herein, the angle between the reception sound axis AX2 and the transmission sound axis AX1 is defined as a reception probe mounting angle. In the case of FIG. 14, the transmission probe 110 is positioned vertically, and the reception probe mounting angle is θ2 shown in FIG. 14.

The fourth embodiment is specifically characterized in that the reception probe mounting angle θ2 is tilted to the side where the transmission sound axis AX1 exists and is set greater than 0. The reception probe 120 is therefore tilted. Specifically, in the shown example of the fourth embodiment, θ2 is set to 10°. Although θ2 is not limited to this angle, θ2 satisfies a condition of θ2<90°.

When the reception probe 120 is tilted, the eccentric distance L is defined as follows. An intersection C2 between the reception sound axis AX2 and the reception probe 120 is defined. An intersection C1 between the transmission sound axis AX1 and the transmission probe 110 (transducer P) is defined. The distance between a coordinate position (x1, y1) as a projection of the position of the intersection C1 onto the x-y plane and a coordinate position (x2, y2) as the projection of the position of the intersection C2 onto the x-y plane is defined as the eccentric distance L.

The inventors actually performed detection of the defect D with the reception probe 120 tilted as described above. This resulted in a threefold increase in received signal strength.

Figure 15:
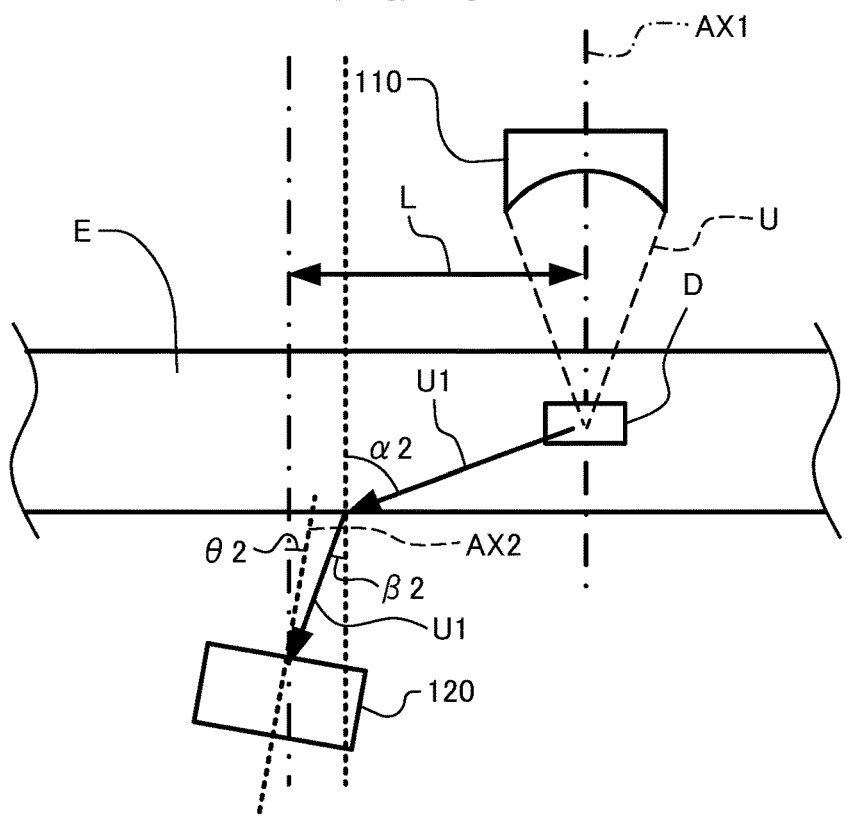
FIG. 15 is a schematic diagram for explaining the reason for the effect according to the fourth embodiment.

FIG. 15 is a schematic diagram for explaining the reason for the effect of the fourth embodiment.

Scattered waves U1 propagate in different directions from the transmission sound axis AX1. As shown in FIG. 15, when the scattered waves U1 reach the outside of the object E, the scattered waves U1 enter the object-outside interface at a non-zero angle α2 to the normal vector of the surface of the object E. The scattered waves U1 exit from the surface of the object E at a non-zero exit angle β2 to the normal vector of the surface of the object E. The reception probe 120 can receive the scattered waves U1 most efficiently when the normal vector of the transducer surface of the reception probe 120 coincides with the travel direction of the scattered waves U1. Thus, tilting the reception probe 120 allows for an increase in received signal strength.

In the structure shown in FIG. 15, the reception effect is maximized if the angle β2 of the ultrasound beams U that exit the object E and the angle θ2 between the reception sound axis AX2 and the normal vector of the transducer surface of the reception probe 120 equal to each other. However, the received signal can be increased even if β2 and θ2 do not completely equal to each other. β2 and θ2 do not need to completely equal to each other as shown in FIG. 15.

(Reception Probe Mounting Angle Adjustment Mechanism)

The ultrasonic inspection device 1a shown in FIG. 14 includes a reception probe mounting angle adjuster 106, with which the reception probe 120 is mounted. With the reception probe mounting angle adjuster 106, the reception probe mounting angle θ2 of the reception probe 120 can be adjusted. Since the path of the scattered waves U1 varies to a certain extent depending on the material, thickness, or the like of the object E, the optimal value of the reception probe mounting angle θ2 also varies. By allowing the reception probe mounting angle adjuster 106 to adjust the reception probe mounting angle θ2, the reception probe mounting angle θ2 can be adjusted appropriately according to the material, thickness, or the like of the object E.

According to the fourth embodiment, the reception probe 120 is tilted with respect to the horizontal plane. However, the transmission probe 110 may be also tilted. Alternatively, the transmission probe 110 may be tilted with respect to the horizontal plane while the transducer surface of the reception probe 120 is positioned in parallel to the horizontal plane (x-y plane). In any of these cases, the transmission sound axis AX1 and reception sound axis AX2 are shifted from each other as shown in FIG. 2B.

Fifth Embodiment

Figure 16:
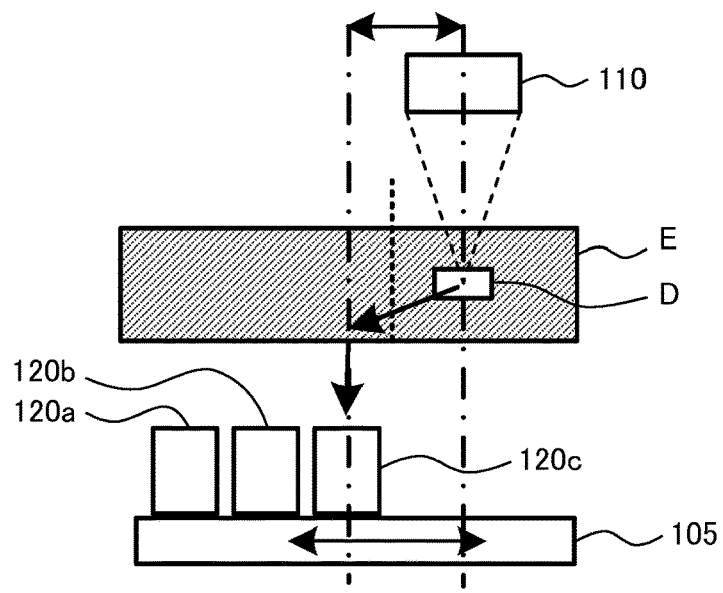
FIG. 16 is a diagram showing the configuration of an ultrasonic inspection device according to a fifth embodiment.

FIG. 16 is a schematic diagram showing the configuration of an ultrasonic inspection device 1b according to a fifth embodiment.

The fifth embodiment is characterized by using plural reception probes 120a to 120c.

In the example shown in FIG. 16, the plural (three, in the example of FIG. 16) reception probes 120a to 120c are mounted.

The path of the scattered waves U1 varies to a certain extent depending on the depth of the defect D, and information concerning the depth of the defect D can be acquired by using information about the position of the reception probe that receives a signal among the plural reception probes 120a to 120c.

The plural reception probes 120a to 120c may be an array probe including plural ultrasound sensitive elements accommodated in a single housing. In this case, the reception probes 120a to 120c of FIG. 16 correspond to the respective ultrasound sensitive elements and are accommodated within a single housing.

The ultrasound sensitive elements are elements that transform ultrasound to an electric signal. The ultrasound sensitive elements may be piezoelectric elements as well as capacitive micro-machined ultrasonic transducers (CMUT) or the like.

(Functional Block Diagram)

Figure 17:
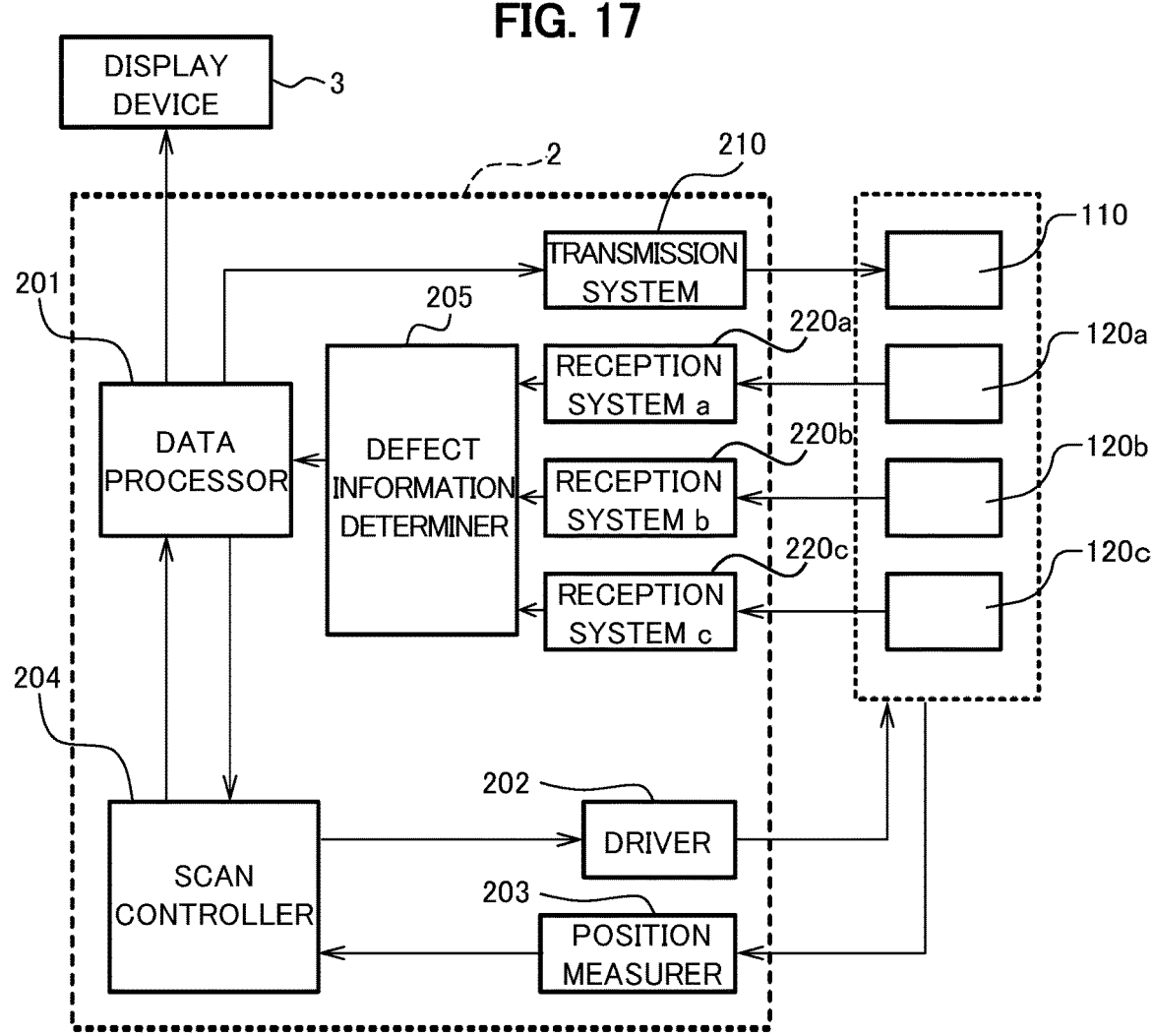
FIG. 17 is a functional block diagram of the ultrasonic inspection device according to the fifth embodiment.

FIG. 17 is a functional block diagram of a control device 2 according to the fifth embodiment.

The plural reception probes 120a to 120c are coupled to reception systems 220a to 220c corresponding thereto. The reception systems 220a to 220c each have the same configuration as that of the reception system 220 shown in FIG. 3. Outputs from the respective reception systems 220a to 220c are inputted to a defect information determiner 205. The defect information determiner 205 determines information concerning the defect D based on results of waveform analyses by the reception systems 220a to 220c. The information concerning the defect D includes the depth of the defect D or the like that is based on the determination by the defect information determiner 205 about which reception probe 120 among the reception probes 120a to 120c detects the scattered waves U1. The information of the position where the scattered waves U1 are observed includes the levels of the received signals (scattered waves U1) detected by the respective reception probes 120a to 120c. This improves the accuracy of the position information of the defect D.

The output of the defect information determiner 205 is inputted into the data processor 201. The data processor 201 combines the same with position information from the scan controller 204 that moves the probes to create an image concerning the information of the defect D and display the created image in the display device 3.

FIG. 17 shows the configuration where the output of the defect information determiner 205 is inputted to the data processor 201. However, the defect information determiner 205 may be provided within the data processor 201.

Sixth Embodiment

Next, the ultrasonic inspection device 1 according to a sixth embodiment of the present invention is described with reference to FIG. 18.

Figure 18:
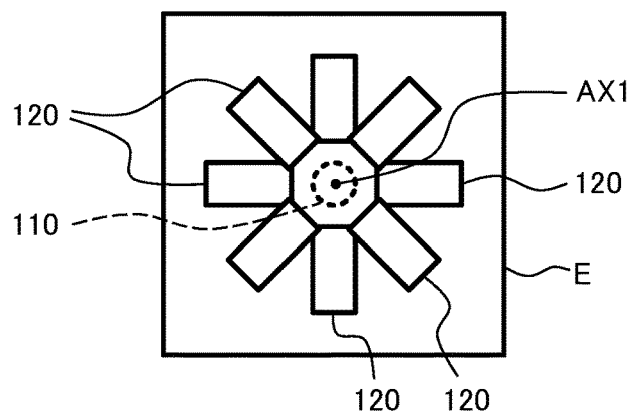
FIG. 18 is a diagram showing the arrangement of reception probes according to a sixth embodiment.

FIG. 18 is a plan view of the positions of the transmission probe 110 and reception probes 120 in the sixth embodiment as seen in the positive z-axis direction of FIG. 1, that is, as seen from the reception probes 120 side.

The sixth embodiment is characterized in that the reception probes 120 are arranged two-dimensionally in the x-y plane directions. In the example of FIG. 18, the reception probes 120 are arranged radially around the transmission sound axis AX1.

The direction of scattered waves U1 varies to a certain extent depending on the shape, the direction of inclination, or the like of the defect D. Arranging the reception probes 120 in two-dimensions as shown in FIG. 17 and recording the directions of the reception probes 120 that have detected the scattered waves U1 provides information about the shape, the direction of inclination, and the like of the defect D with a higher degree of accuracy.

Seventh Embodiment

Next, a seventh embodiment of the present invention is described with reference to FIGS. 19 and 20.

Figure 19:
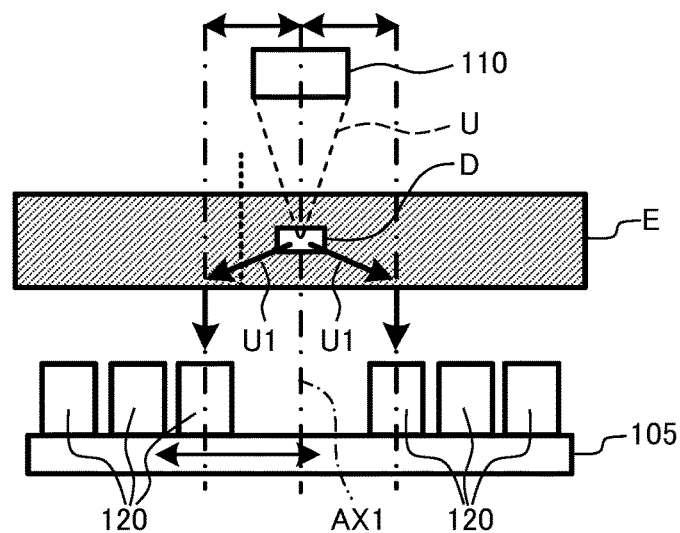
FIG. 19 is a diagram showing the arrangement of reception probes according to a seventh embodiment (No. 1)

In FIG. 19, reception probes 120 are arranged symmetrically to the reception probes 120 in the configuration of FIG. 15 with respect to the transmission sound axis AX1.

Figure 20:
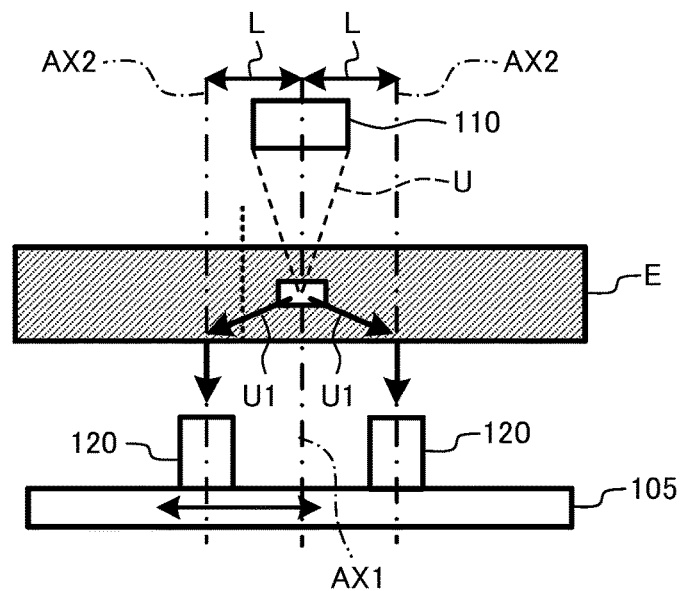
FIG. 20 is a diagram showing the arrangement of reception probes according to the seventh embodiment (No. 2)

In FIG. 20, the reception probe 120 is arranged symmetrically to the reception probe 120 of the configuration in FIG. 1 with respect to the transmission sound axis AX1. The two reception probes 120 are arranged such that each reception sound axis AX2 be positioned at the eccentric distance L from the transmission sound axis AX1.

As shown in FIGS. 19 and 20, arranging the reception probes 120 on both sides of the transmission probe 110 allows for detection of the scattered waves U1 in a wider range. Furthermore, the control device 2 may be configured to, when the reception probes 120 on both sides detect the scattered waves U1, actually determine the defect D and, when only the reception probes 120 on one side detect the scattered waves U1, determine that the detection is error. This can improve the accuracy of detecting the defect D.

[Flowchart]

Figure 21:
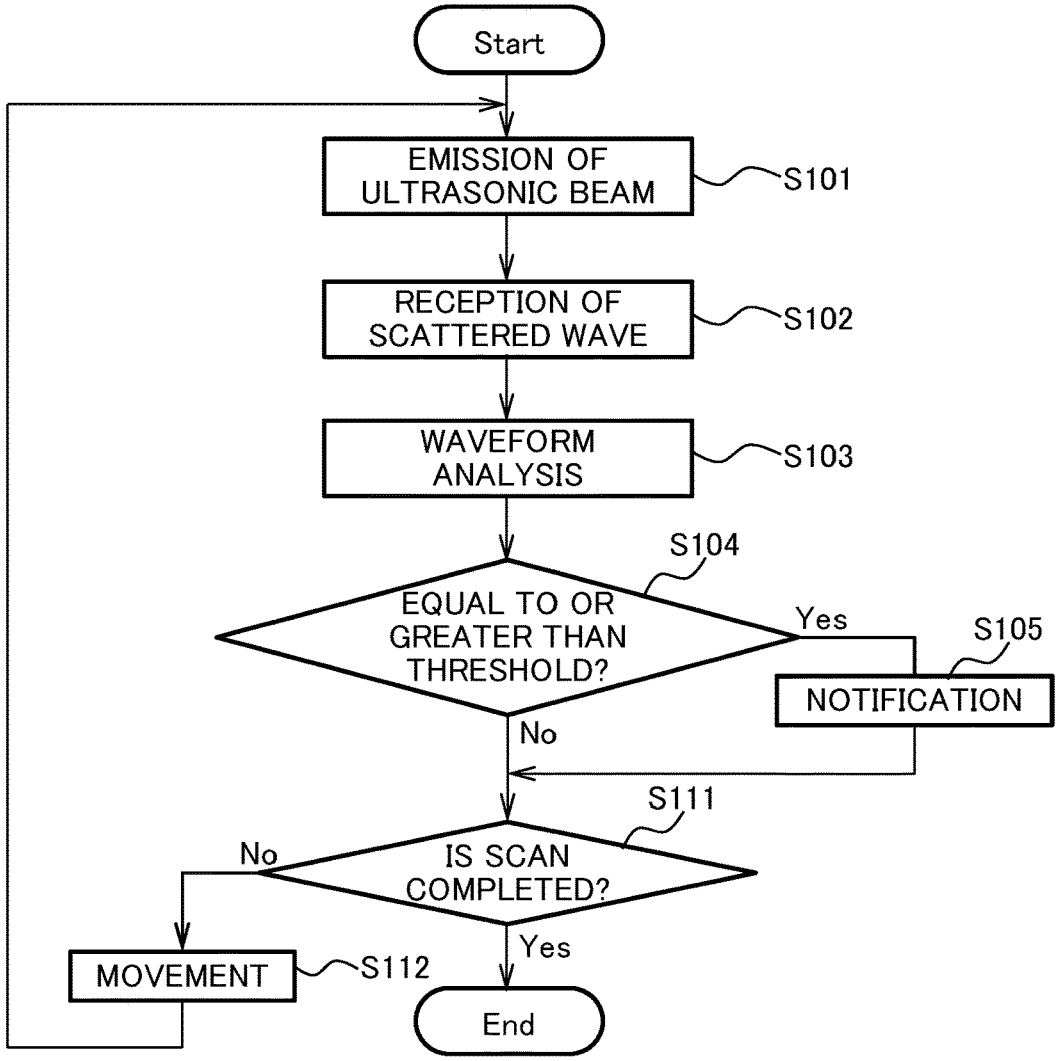
FIG. 21 is a flowchart showing a processing procedure of the ultrasonic inspection device.

FIG. 21 is a flowchart showing a processing procedure by the ultrasonic inspection system Z. In FIG. 21, the processing of the ultrasonic inspection system Z of the first embodiment is described.

First, the transmission probe 110 emits the ultrasound beams U upon an instruction by the control device 2 (S101).

Subsequently, the reception probe 120 receives the scattered waves U1 due to the defect D (S102).

Based on the received signal acquired from the reception probe 120, then, the waveform analyzer 221 performs a waveform analysis (S103). Herein, the waveform analyzer 221 extracts (creates) the signal strength data from the received signal shown in FIG. 5B.

As the signal strength data, the peak-to-peak value of the received signal shown in FIG. 5B, that is, the difference between the maximum and minimum in a proper time domain may be extracted. Another example of the signal strength data may be acquired by transforming the received signal shown in FIG. 5B into frequency components through signal processing such as short-time Fourier transformation and extracting the strength of a proper frequency component. Furthermore, the signal strength data may be a correlation function extracted based on a proper reference wave.

The signal strength data is thus acquired for each scan position of the transmission probe 110.

The scan position information of the transmission probe 110 and the reception probe 120 is sent from the position measurer 203 to the scan controller 204.

The data processor 201 plots the signal strength data for each scan position against the scan position information of the transmission probe 110 acquired from the scan controller 204 (signal strength graph G). The signal strength data shown in FIG. 6 are thus visualized. FIG. 6 shows a case where the scan positions are arranged linearly (in one direction).

When the scan position information includes two-dimensional positions x and y, plotting the signal strength data provides a defect position as a two-dimensional image, which is then displayed in the display device 3.

The data processor 201 determines whether each value of the created signal strength data is equal to or greater than a predetermined threshold (S104). It is thereby determined whether the defect D is detected. The method like step S104 can detect the presence of the defect D because the method according to the first embodiment provides a good SN ratio as shown in FIG. 6. In the comparative example, the SN ratio is low as shown in FIG. 9, and the method like step S104 will cause a lot of errors.

If the value of the created signal strength data is equal to or higher than the predetermined threshold (S104->Yes), the data processor 201 notifies the user of detection of the defect D (S105). The processing of step S105 may be performed after the entire scan is completed. The notification of detection of the defect D is displayed in the display device 3, for example. The data processor 201 then moves the process to step S111.

If the value of the created signal strength graph G is less than the predetermined threshold as the result of step S104 (S104->No), the data processor 201 then determines whether the scan is completed (S111).

If the scan is completed (S111->Yes), the control device 2 terminates the process.

If the scan is not completed (S111->No), the data processor 201 outputs an instruction to the driver 202 to move the transmission probe 110 and reception probe 120 to the next scan position (S112) and returns the process to step S101.

[Hardware Configuration]

Figure 22:
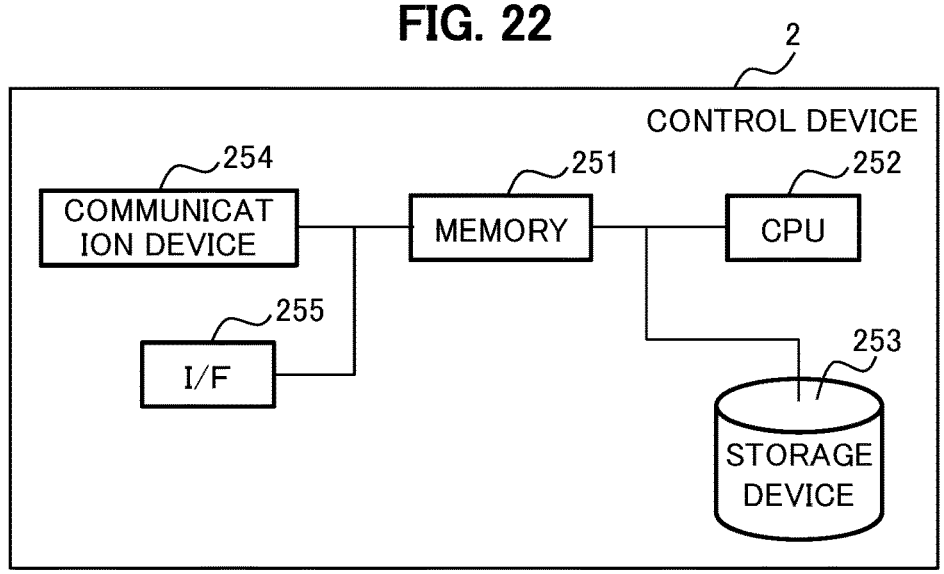
FIG. 22 is a diagram showing a hardware configuration of the control device.

FIG. 22 is a diagram illustrating a hardware configuration of the control device 2.

The control device 2 includes a memory 251, such as a random access memory (RAM), a central processing unit (CPU) 252, a storage device 253, such as a read only memory (ROM) or a hard disk drive (HDD), a communication device 254, such as a network interface card (NIC), an interface (I/F) 255, and the like.

In the control device 2, a predetermined control program stored in the storage device 253 is loaded onto the memory 251 and executed by the CPU 252. This embodies the data processor 201, position measurer 203, scan controller 204, defect information determiner 205, waveform analyzer 221, and the like shown in FIGS. 3 and 17.

In the examples described in the embodiments, the defect D is hollow. However, the defect D may be a foreign substance which is made of a different material from the object E and is mixed in the same. In this case, an acoustic impedance gap in the interface where the different materials are in contact with each other also causes the scattered waves U1, so that the configuration of the embodiments is effective.

The ultrasonic inspection system Z according to the embodiments is premised on an ultrasonic defect video device but may be applied to a non-contact in-line internal defect inspection device.

The present invention is not limited to the aforementioned embodiments and includes various modifications. For example, the aforementioned embodiments are described in detail for clearly explaining the present invention and are unnecessarily limited to ones including all the described configurations. A part of the configuration of a certain embodiment can be replaced with the configuration of another embodiment, and the configuration of a certain embodiment can be added to the configuration of another embodiment. Alternatively, for a part of the configuration of each embodiment, another configuration can be added, deleted, or replaced.

Part or all of each of the aforementioned configurations, functions, and sections 201 to 205, 211 to 212, and 221 to 222, and storage device 253, and the like may be implemented in hardware, for example, by being designed as an integrated circuit. As shown in FIG. 22, the aforementioned configurations, functions, and the like may be implemented in software, for example, by the processor such as the CPU 252 interpreting and executing programs that implement the respective functions. The information such as the programs, tables, and files for implementing the functions can be stored in an HD as well as in a recording device, such as the memory 251 or a solid state drive (SSD), or a storage medium, such as an integrated circuit (IC) card, a secure digital (SD) card, and a digital versatile disc (DVD).

Each embodiment shows the control lines and information lines only required for explanation and unnecessarily shows all the control lines and information lines of the product. In fact, almost all the configurations could be coupled to each other.

REFERENCE SIGNS LIST 1, 1a, 1b ULTRASONIC INSPECTION DEVICE (ULTRASONIC INSPECTOR)
2 CONTROL DEVICE (CONTROLLER)
105 ECCENTRIC DISTANCE ADJUSTER (DISTANCE ADJUSTER)
106 RECEPTION PROBE MOUNTING ANGLE ADJUSTER (MOUNTING ANGLE ADJUSTER)
110 TRANSMISSION PROBE
120, 120a to 120c RECEPTION PROBE
205 DEFECT INFORMATION DETERMINER
221 WAVEFORM ANALYZER (SIGNAL PROCESSOR)
AX1 TRANSMISSION SOUND ANALYZER (FIRST SOUND AXIS)
AX2 RECEPTION SOUND ANALYZER (SECOND SOUND AXIS)
D DEFECT
E OBJECT
G SIGNAL STRENGTH GRAPH (SIGNAL STRENGTH DATA)
N NORMAL PART
R1 FOCAL RANGE (TRANSMISSION PROBE)
R2 FOCAL RANGE (RECEPTION PROBE)
T1 BEAM INCIDENCE AREA (TRANSMISSION PROBE)
T2 BEAM INCIDENCE AREA (RECEPTION PROBE)
U ULTRASOUND BEAM
U1 SCATTERED WAVE
Z ULTRASONIC INSPECTION SYSTEM
S101 EMISSION OF ULTRASOUND BEAM (ULTRASOUND BEAM EMISSION STEP)
S102 RECEPTION OF SCATTERED WAVE (SCATTERED WAVE RECEPTION STEP)
S103 WAVEFORM ANALYSIS (WAVEFORM ANALYSIS STEP)
S104 DETERMINATION WHETHER DATA IS EQUAL TO OR GREATER THAN THRESHOLD (DEFECT DETERMINATION STEP)

The invention claimed is:

1. An ultrasonic inspection system that causes an ultrasound beam to enter an object through a gas for inspection of the object, the device comprising:
   a transmission probe emitting the ultrasound beam;
   a reception probe mounted on an opposite side of the object from the transmission probe; and
   a distance adjuster that adjusts an eccentric distance between a transmission sound axis of the transmission probe and a reception sound axis of the reception probe to a distance greater than zero, wherein
   the transmission probe and the reception probe perform scanning while keeping the eccentric distance in an x-axis direction or a y-axis direction on condition that an x-y plane is approximately parallel to a bottom of the object, and
   the transmission probe is mounted such that the transmission sound axis is perpendicular to the x-y plane.

2. The ultrasonic inspection system according to claim 1, wherein the distance adjuster sets the eccentric distance so that the strength of a received signal detected by the reception probe for a defect be greater than that for normal part of the object.

3. The ultrasonic inspection system according to claim 1, wherein the distance adjuster sets the eccentric distance so that any significant received signal be not detected for normal part of the object.

4. The ultrasonic inspection system according to claim 1, wherein the reception probe has a focal range greater than the transmission probe.

5. The ultrasonic inspection system according to claim 1, wherein the reception probe has a beam incident area greater than the transmission probe.

6. The ultrasonic inspection system according to claim 1, further comprising
   a mounting angle adjuster that adjusts and sets at least one of the transmission probe and reception probe such that the angle between the transmission sound axis of the transmission probe and the reception sound axis of the reception probe be greater than zero and smaller than 90°.

7. The ultrasonic inspection system according to claim 1, wherein the reception probe includes a plurality of the reception probes.

8. The ultrasonic inspection system according to claim 7, further comprising:

a defect information determiner that receives outputs from the plurality of reception probes through a signal processor and determines which reception probe among the plurality of reception probes has detected a scattered wave from a defect.

9. The ultrasonic inspection system according to claim 7, wherein
the plurality of reception probes are radially arranged around the transmission sound axis of the transmission probe.

10. The ultrasonic inspection system according to claim 7, wherein the plurality of reception probes are arranged on both sides of the transmission sound axis of the transmission probe.

11. The ultrasonic inspection system according to claim 1, wherein an oscillator of the reception probe has a shape in which a characteristic length in the direction of the eccentric distance is greater than that in the direction orthogonal thereto.

12. An ultrasonic inspection method, in an ultrasonic inspection system that includes an ultrasonic inspector and a controller controlling the ultrasonic inspector and causes an ultrasound beam to enter an object through a gas for inspection of the object,
the ultrasonic inspector including:
a transmission probe emitting the ultrasound beam;
a reception probe mounted on an opposite side of the object from the transmission probe; and
a distance adjuster that adjusts an eccentric distance between a transmission sound axis of the transmission probe and a reception sound axis of the reception probe to a distance greater than zero, wherein
the transmission probe and the reception probe perform scanning while keeping the eccentric distance in an x-axis direction or a y-axis direction on condition that an x-y plane is approximately parallel to a bottom of the object, and
the transmission probe is mounted such that the transmission sound axis is perpendicular to the x-y plane,
the controller executing:
an ultrasound beam emission step of emitting an ultrasound beam from the transmission probe;
a scattered wave reception step of in the reception probe, receiving a scattered wave which is scattered due to a defect of the object; and
a waveform analysis step of generating signal strength data based on a signal of the received scattered wave.

13. The ultrasonic inspection method according to claim 12, executing:
a defect determination step of determining the presence of the defect by determining whether the signal strength data generated in the waveform analysis step is less than a predetermined threshold.

14. An ultrasonic inspection system that causes an ultrasound beam to enter an object through a gas for inspection of the object, the device comprising:
a transmission probe emitting the ultrasound beam;
a reception probe mounted on an opposite side of the object from the transmission probe; and
a distance adjuster that adjusts an eccentric distance between a transmission sound axis of the transmission probe and a reception sound axis of the reception probe to a distance greater than zero,
wherein the reception probe has a focal range greater than the transmission probe.

15. The ultrasonic inspection system according to claim 14, wherein the distance adjuster sets the eccentric distance so that the strength of a received signal detected by the reception probe for a defect be greater than that for normal part of the object.

16. The ultrasonic inspection system according to claim 14, wherein the distance adjuster sets the eccentric distance so that any significant received signal be not detected for normal part of the object.

17. The ultrasonic inspection system according to claim 14, wherein the reception probe is a non-beam-focusing type probe.

18. The ultrasonic inspection system according to claim 14, further comprising:
a mounting angle adjuster that adjusts and sets at least one of the transmission probe and reception probe such that the angle between the transmission sound axis of the transmission probe and the reception sound axis of the reception probe be greater than zero and smaller than 90°.

19. The ultrasonic inspection system according to claim 14, wherein the reception probe includes a plurality of the reception probes.

20. An ultrasonic inspection system that causes an ultrasound beam to enter an object through a gas for inspection of the object, the device comprising:
a transmission probe emitting the ultrasound beam;
a reception probe mounted on an opposite side of the object from the transmission probe; and
a distance adjuster that adjusts an eccentric distance between a transmission sound axis of the transmission probe and a reception sound axis of the reception probe to a distance greater than zero,
wherein the reception probe has a beam incident area greater than the transmission probe.

21. An ultrasonic inspection system that causes an ultrasound beam to enter an object through a gas for inspection of the object, the device comprising:
a transmission probe emitting the ultrasound beam;
a reception probe mounted on an opposite side of the object from the transmission probe; and
a distance adjuster that adjusts an eccentric distance between a transmission sound axis of the transmission probe and a reception sound axis of the reception probe to a distance greater than zero,
wherein the reception probe includes a plurality of the reception probes, and
further comprising a defect information determiner that receives outputs from the plurality of reception probes through a signal processor and determines which reception probe among the plurality of reception probes has detected a scattered wave from a defect.

22. An ultrasonic inspection system that causes an ultrasound beam to enter an object through a gas for inspection of the object, the device comprising:
a transmission probe emitting the ultrasound beam;
a reception probe mounted on an opposite side of the object from the transmission probe; and
a distance adjuster that adjusts an eccentric distance between a transmission sound axis of the transmission probe and a reception sound axis of the reception probe to a distance greater than zero,
wherein the reception probe includes a plurality of the reception probes, and
wherein the plurality of reception probes are radially arranged around the transmission sound axis of the transmission probe.

* * * * *

UNITED STATES PATENT AND TRADEMARK OFFICE
CERTIFICATE OF CORRECTION

PATENT NO. : 12,222,324 B2
APPLICATION NO. : 17/636631
DATED : February 11, 2025
INVENTOR(S) : Mutsumi Suzuki Page 1 of 1

It is certified that error appears in the above-identified patent and that said Letters Patent is hereby corrected as shown below:

On the Title Page

PCT filing date should be Aug. 21, 2020 instead of Aug. 1, 2020

Signed and Sealed this
Fifteenth Day of April, 2025

Coke Morgan Stewart
*Acting Director of the United States Patent and Trademark Office*